United States Patent
Dassen

(10) Patent No.: US 7,887,115 B2
(45) Date of Patent: Feb. 15, 2011

(54) OVERHEAD CONSOLE

(75) Inventor: Arne Dassen, Holland, MI (US)

(73) Assignee: Johnson Controls Technology Company, Holland, MI (US)

(*) Notice: Subject to any disclaimer, the term of this patent is extended or adjusted under 35 U.S.C. 154(b) by 0 days.

(21) Appl. No.: 12/526,764

(22) PCT Filed: Mar. 14, 2008

(86) PCT No.: PCT/US2008/057078

§ 371 (c)(1),
(2), (4) Date: Aug. 11, 2009

(87) PCT Pub. No.: WO2008/113014

PCT Pub. Date: Sep. 18, 2008

(65) Prior Publication Data

US 2010/0127525 A1 May 27, 2010

Related U.S. Application Data

(60) Provisional application No. 60/918,168, filed on Mar. 15, 2007.

(51) Int. Cl.
*B60R 7/04* (2006.01)
(52) U.S. Cl. .................. 296/37.7; 296/37.8
(58) Field of Classification Search ........... 296/37.1, 296/37.7, 37.8, 37.9, 37.12, 37.13; 428/343
See application file for complete search history.

(56) References Cited

U.S. PATENT DOCUMENTS

| 5,713,623 A | * | 2/1998 | Mattingly | .......... 296/37.7 |
| 2003/0184108 A1 | | 10/2003 | Donovan et al. | |

FOREIGN PATENT DOCUMENTS

| DE | 103 60 729 A1 | 7/2005 |
| EP | 1 293 382 A2 | 3/2003 |
| FR | 2 781 971 A1 | 2/2000 |

OTHER PUBLICATIONS

PCT International Search Report corresponding to PCT Application No. PCT/US2008/057078, dated Dec. 16, 2008, 4 pages.
PCT Written Opinion corresponding to PCT Application No. PCT/US2008/057078, dated Dec. 16, 2008, 9 pages.

* cited by examiner

*Primary Examiner*—Lori L Lyjak
(74) *Attorney, Agent, or Firm*—Foley & Lardner LLP

(57) ABSTRACT

An overhead console for a vehicle includes a substrate formed of a substantially clear material configured to provide a conduit for light. The substrate has a first surface and an opposite second surface. The overhead console also includes a first film layer coupled to the first surface of the substrate. The first film layer has a first portion simulating a first component of the overhead console and a second portion simulating a second component of the overhead console. The overhead console further includes a second film layer coupled to the second surface of the substrate. The second film layer is configured to cooperate with the first film layer to affect the appearance of at least one of the first component and second component.

20 Claims, 7 Drawing Sheets

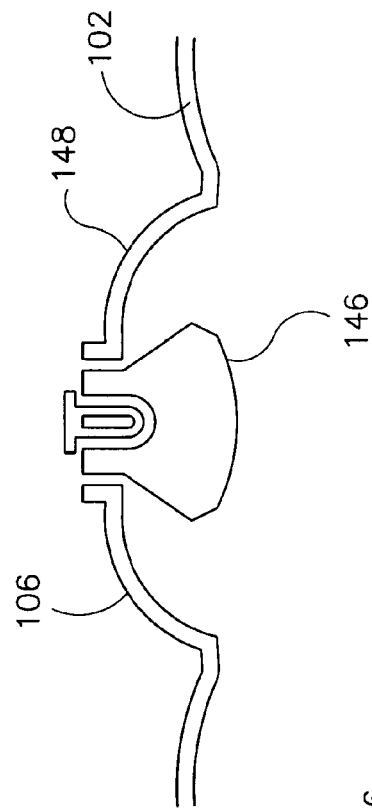
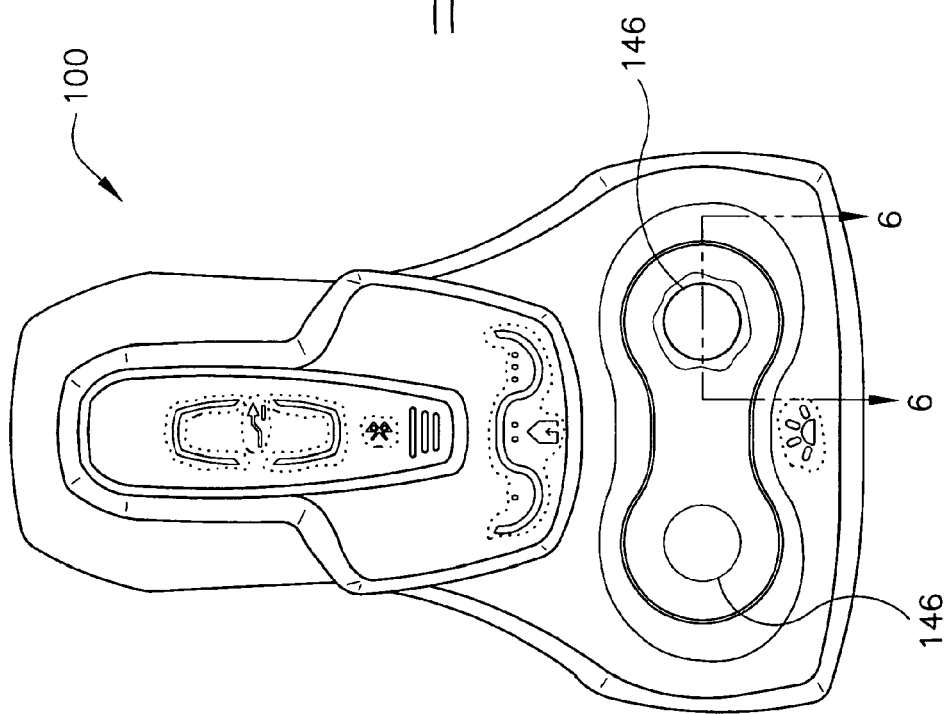

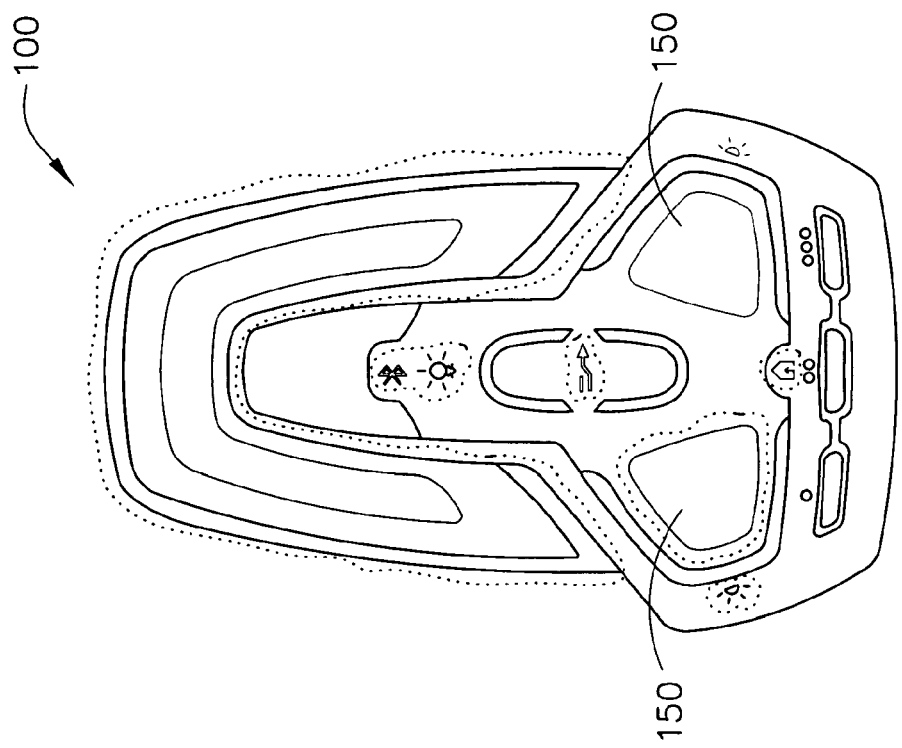
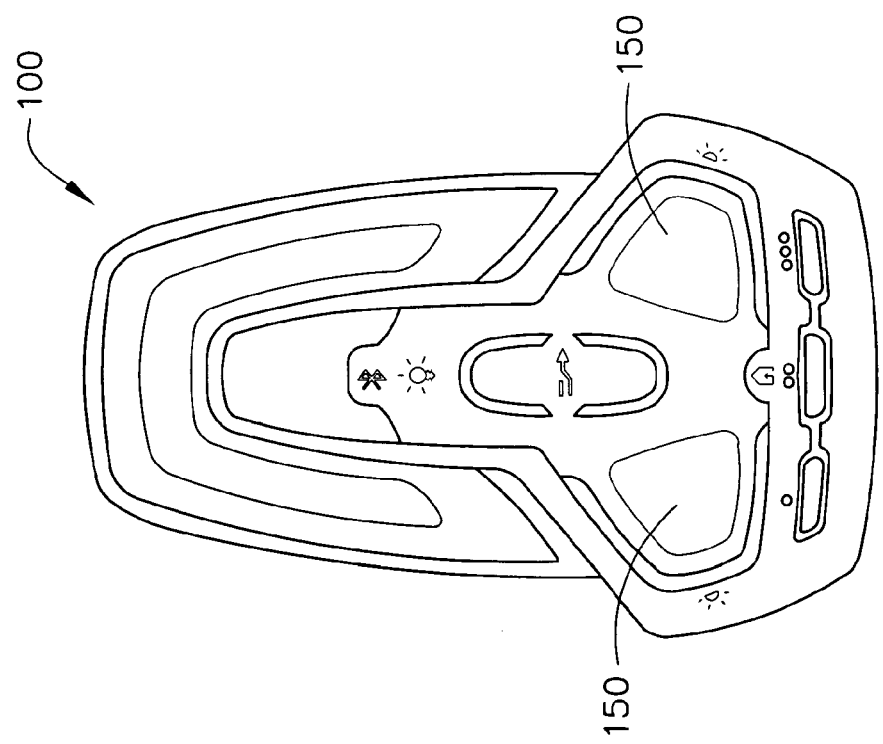

US 7,887,115 B2

OVERHEAD CONSOLE

CROSS-REFERENCE TO RELATED PATENT APPLICATIONS

The present application is a National Stage of PCT/US2008/057078, filed Mar. 14, 2008 which claims the benefit under 35 U.S.C. §119(e) of U.S. Provisional Patent Application No. 60/918,168, having a filing date of Mar. 15, 2007 and titled "Overhead Console". The foregoing applications are incorporated by reference herein in their entirety.

BACKGROUND

Overhead consoles may be provided in a vehicle to provide overhead lighting, storage compartments, and other functionality including short-range radio communication devices, display devices, etc. Such overhead consoles may be include a multitude of components to provide the necessary structural pieces along with any decorative trim pieces such as chrome pieces, wood veneers, or brushed metal pieces. However, an increased number of components adds manufacturing and assembly time, increased cost of the final product and increased potential for buzz, squeak, rattle and other similar quality issues.

Accordingly, it would be advantageous to provide an overhead console that is able to maintain the appearance of a wide variety of materials, finishes and/or components while maintaining a relatively low number of actual components. Such an overhead console may be adapted to match the interiors of a wide variety of vehicles with different configurations.

SUMMARY

One embodiment of the invention relates to an overhead console for a vehicle. The overhead console includes a substrate formed of a substantially clear material configured to provide a conduit for light. The substrate has a first surface and an opposite second surface. The overhead console also includes a first film layer coupled to the first surface of the substrate. The first film layer has a first portion simulating a first component of the overhead console and a second portion simulating a second component of the overhead console. The overhead console further includes a second film layer coupled to the second surface of the substrate. The second film layer is configured to cooperate with the first film layer to affect the appearance of at least one of the first component and the second component.

Another embodiment of the invention relates to an overhead console for a vehicle. The overhead console includes a substrate formed of a substantially clear material configured to provide a conduit for light. The substrate has a first surface and an opposite second surface. The overhead console also includes a first film layer coupled to the first surface of the substrate. The first film layer defines an opening through which a portion of the substrate extends. The portion of the substrate that extends through the first film creates the appearance of a lens for a lamp.

Another embodiment of the invention relates to a method of making an overhead console for a vehicle. The method includes forming a substrate of a substantially clear material configured to provide a conduit for light. The substrate has a first surface and an opposite second surface. The method also includes providing a first film layer on the first surface of the substrate. The first film layer has a first portion simulating a first component of the overhead console and a second portion simulating a second component of the overhead console. The method further includes providing a second film layer on the second surface of the substrate. The second film layer is configured to cooperate with the first film layer to affect the appearance of at least one of the first component and the second component.

BRIEF DESCRIPTION OF THE DRAWINGS

FIG. 5 is bottom view of an overhead console for a vehicle according to another exemplary embodiment.

FIG. 6 is a partial cross-section of the overhead console of FIG. 5 showing a light according to another exemplary embodiment.

FIG. 7A is bottom view of an overhead console for a vehicle according to another exemplary embodiment shown in an unlit configuration.

FIG. 7B is bottom view of the overhead console of FIG. 7A shown in a lit configuration.

DETAILED DESCRIPTION

The FIGURES illustrate exemplary embodiments of a molded article or an interior component, shown as an overhead console for use within a vehicle (e.g., automobiles such as cars, minivans, trucks, buses and the like, airplanes, boats, etc.). Such overhead consoles may be provided in a wide variety of sizes, shapes, materials and configurations according to the various exemplary embodiments. According to an exemplary embodiment, the overhead consoles are integrally formed as a substantially one-piece unitary body while providing the appearance of being formed of more than one material and/or component (e.g., bezels, lenses, controls, housings, etc.).

Figure 1A:
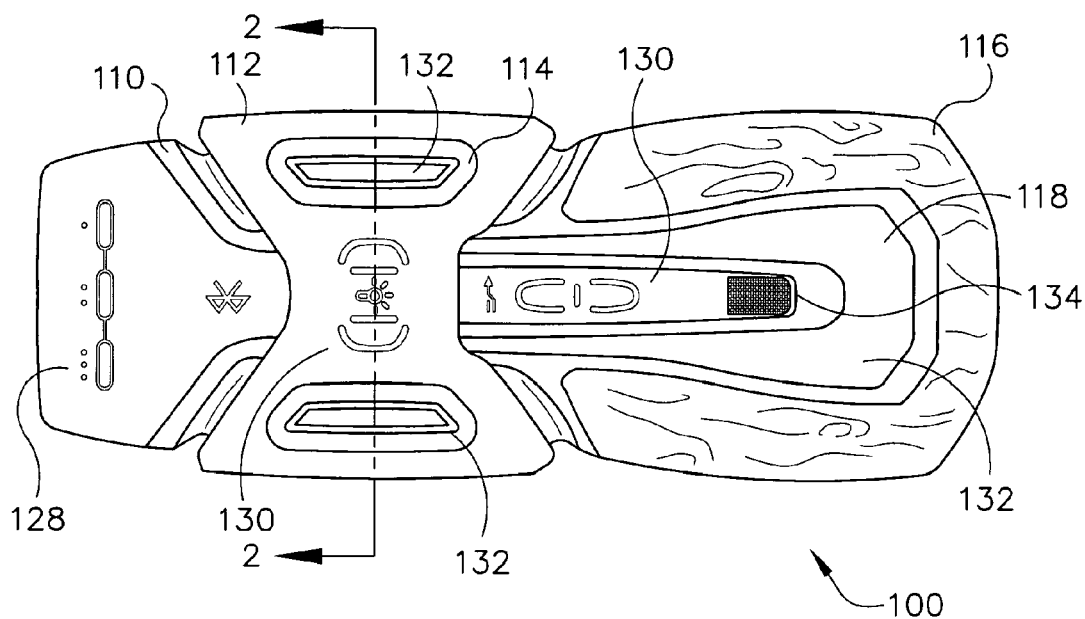
FIG. 1A is bottom view of an overhead console for a vehicle according to an exemplary embodiment shown in an unlit configuration.
Figure 1B:
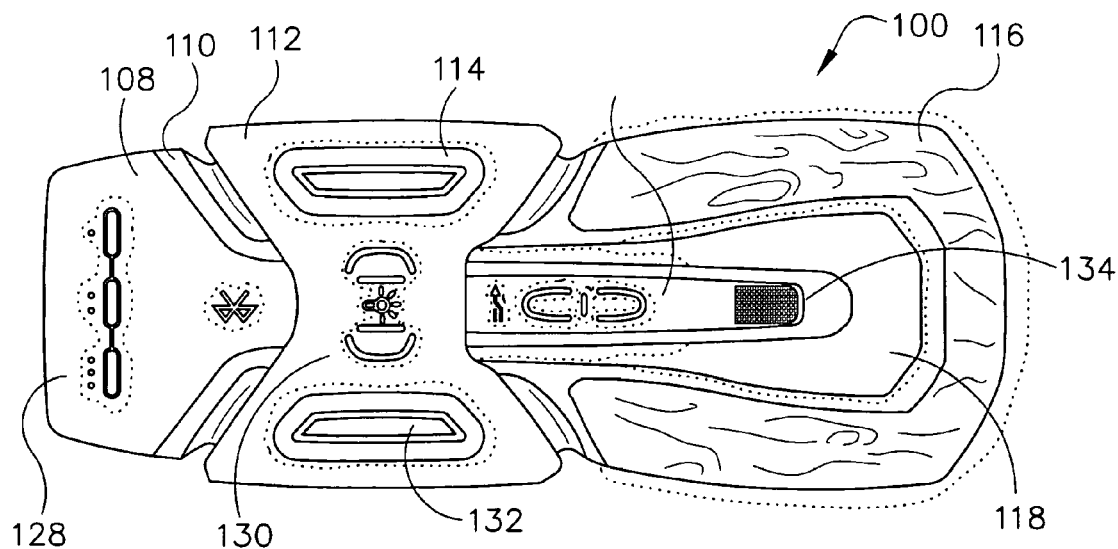
FIG. 1B is bottom view of the overhead console of FIG. 1A shown in a lit configuration.

FIGS. 1A and 1B show an overhead console 100 for a vehicle according to one exemplary embodiment. The overhead console 100 is configured to be coupled to or otherwise supported at the roof of a vehicle. For example, the overhead console 100 may be supported between the driver and the front seat passenger and extend in a generally fore and aft direction relative to the direction of the vehicle. According to the various alternative embodiments, the overhead console may be configured to extend in a substantially lateral direction relative to the direction of the vehicle. The overhead console 100 provides various functionality for an occupant of the vehicle, including vehicle controls (e.g., power window or lock controls, audio controls, light controls, etc.), lights, short range radio communication (e.g., Bluetooth®, Homelink®, etc.), a microphone and/or any other functional mechanism that may be desirable to an occupant. The overhead console 100 also serves an aesthetic function by providing at least the appearance of being formed of different (e.g., separate, multiple, etc.) components or parts, the components having different surface finishes and decorative lighting effects and/or by concealing or hiding certain functional features when backlighting is no longer provided to the overhead console.

The overhead console 100 generally includes a base portion (e.g., support structure, substantially rigid portion, etc.), shown as a substrate 102, having a first surface (e.g., exposed surface, outer surface, etc.), shown as an A surface 104 and a second surface (e.g., concealed surface, inner surface, etc.), shown as a B surface 106. According to the embodiment illustrated, the substrate 102 is formed of substantially rigid material that is at least partially transparent or translucent. For example, the substrate 102 may be formed of a molded plastic material such as polycarbonate, polyester, acrylic or any other known or otherwise suitable material having similar properties for allowing light to pass through. In addition to providing support for the overhead console 100, the substrate 102 also functions as a conduit (e.g., guide, medium, light pipe, etc.) for light so that light (e.g., backlight, etc.) emitted at a first portion (e.g., surface, edge, etc.) of the substrate 102 can be irradiated at a second portion of the substrate 102.

The overhead console 100 also includes at least one cover layer (e.g., skin, coverstock, flexible member, outer layer, etc.), shown as a film layer, supported on the A surface 104 of the substrate 102. The film layer is applied to at least a portion of substrate on the A surface, the B surface and/or both the A surface and the B surface. According to an exemplary embodiment, the film layer is coupled to the substrate 102 via a molding process (e.g., a mold-behind process, etc.). According to the various alternative embodiments, the film layer may be coupled to the substrate or supported adjacent thereto via any suitable technique.

The film layer may be printed with a wide variety of patterns to simulate different materials (e.g., a wood grain, white porcelain, metal, chrome, glass, etc.) and finishes (e.g., flat, satin, polished, brushed, frosted, high gloss, matte, etc.). According to an exemplary embodiment, the film layer is formed of a resilient material such as silicone. The film layer may also be formed using some other elastomer material. Depending on the particular application, at least a portion of the material forming the film layer may be substantially transparent or translucent, to permit emanation or backlighting. In such exemplary embodiments, the portion of the film layer which is transparent or translucent may be a thinned portion of the same material forming the rest of the film layer. Other portions of the film layer or other film layers may be substantially opaque.

According to the embodiment illustrated in FIGS. 1A and 1B, a plurality of film layers are coupled to the substrate 102 to simulate an overhead console with multiple parts or components despite being formed as a one-piece member. For example, the overhead console 100 is shown as including a first film layer 108 that provides a brushed titanium look or appearance, a second film layer 110 that provides a chrome look or appearance, a third film layer 112 that provides a substantially clear look or appearance, a fourth film layer 114 that provides a frosted look or appearance, a fifth film layer 116 that provides a wood grain look or appearance and a sixth film layer 118 that provides a porcelain white look or appearance.

Figure 2:
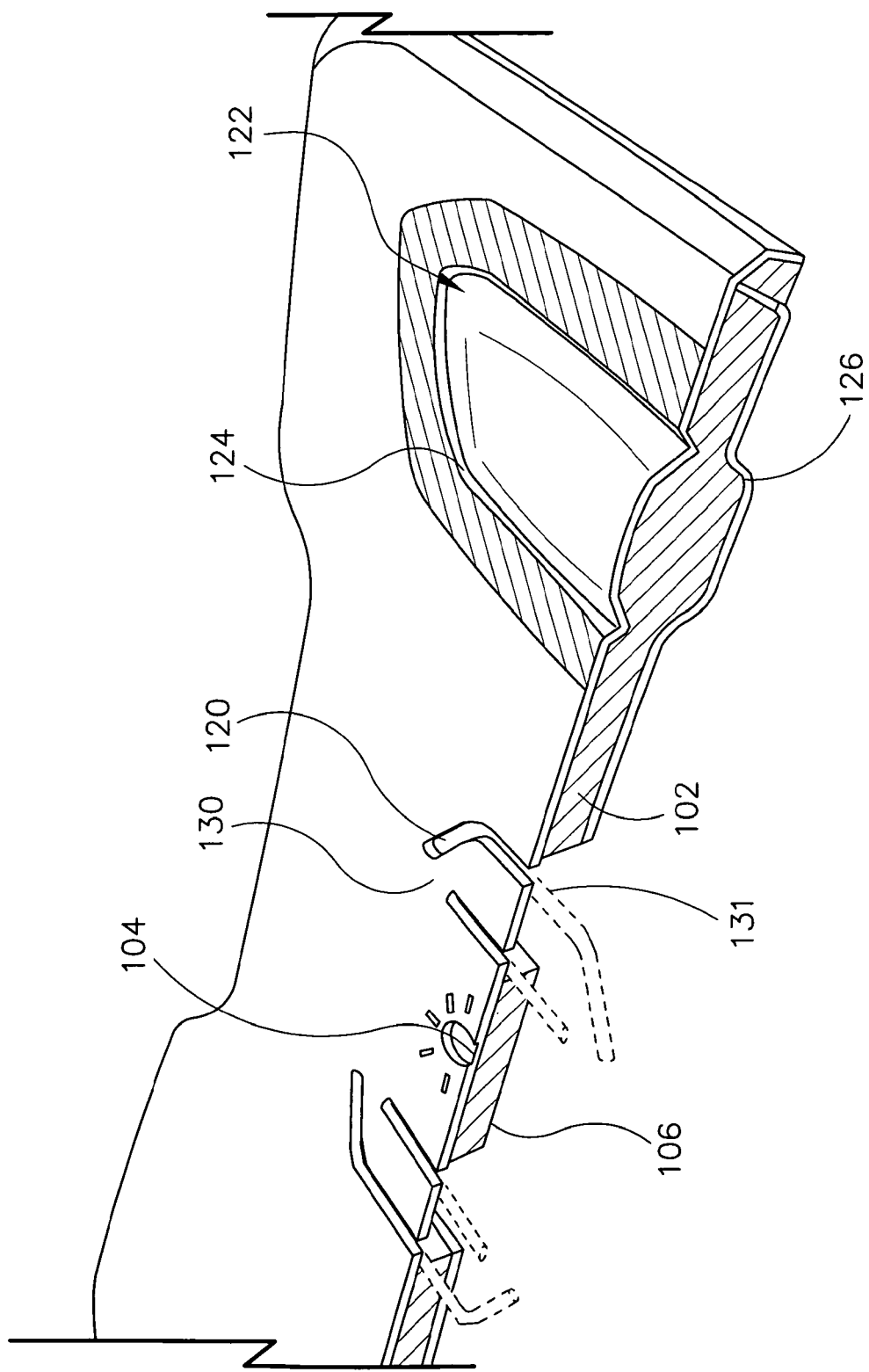
FIG. 2 is an isometric partial cross-section view of the overhead console in FIGS. 1A and 1B.

Referring to FIG. 2, the film layers 108 through 118 are shown as being coupled to the A surface 104 of the substrate. The film layers 108 through 118 may be formed as one sheet with different printings for each film layer, or alternatively, may be formed as separate sheets. One or more of the film layers may include an aperture or opening that allows a portion of the substrate 102 to be exposed or revealed. Since the substrate 102 is capable of acting as a conduit for a light source (not shown) and the exposed portions may act as backlighting, mood lighting, or directed task lighting. For example, according to an illustrated embodiment, the third layer 112 defines a plurality of openings 120 that when used with backlighting to define various controls on the overhead console 100. Further, the fourth film layer 114 defines an opening 122 that allows the substrate 102 act as a lens for an overhead task light. According to such an embodiment, the substrate 102 extends outward past the fourth film layer 114 to simulate the task light. Further still, one or more grooves (e.g., slots, etc.), shown as a recess 124, may be provided between the various film layers (e.g., at color and/or texture transitions, etc.) to further simulate multiple parts.

The overhead console 100 further includes another film layer coupled to or otherwise supported adjacent to the B surface 106 of the substrate 102. Providing a film layer at the B surface 106 of the substrate 102 may cooperate with one or more of the film layers on the A surface 104 to create a desired look or appearance. For example, a film layer having a wood grain pattern may be coupled to the B surface 106 opposite the fifth film layer 116 coupled to the A surface 104 to provide depth to this portion of the overhead console 100 thereby creating a more realistic wood veneer appearance.

Referring back to FIGS. 1A and 1B, the film layer provided at the B surface 106 may also include portions that are configured to alter the appearance of lights for the console around some of the controls (e.g., buttons, etc.). According to an exemplary embodiment, the film layer provided at the B surface 106 is printed with a semi-reflective layer and a colored layer. Such a configuration allows the film layer provided at the B surface 106 to present a generally mirrored appearance at the A surface 104 when a light source (e.g., backlighting, etc.) is off, as shown in FIG. 1A, and a colored appearance when the light source is on, as shown in FIG. 1B.

Referring to FIG. 2, a seventh film layer 126 is coupled to the B surface 106 of the substrate 102 in a region opposite the opening 122 and the task light associated therewith. The seventh film layer 126 may assist in enhancing and/or directing the light as it is used as a task light through the substrate 102. For example, the seventh film layer 126 may provide a frosted look or appearance for light emanating from the substrate 102 at the opening 122.

According to an exemplary embodiment, one or more of the film layers includes a functional region. A functional region is a region of the film layer that allows interaction with or manipulation of a mechanical, electrical or other type of control device beneath the film layer that frames, surrounds or covers a design and/or functional aspect of the protective outer layer, and/or that transmits light or the like through the protective outer layer. For example, the functional region may allow interaction with a push button switch located beneath the film layer and substantially aligned with the aperture in the plastic substrate and the functional region of the film layer. Likewise, the functional region may allow interaction with a capacitance switch located beneath the film layer and substantially aligned with the aperture in the plastic substrate and the functional region. The functional region may be a light, a bezel or a lens that surrounds, frames or covers a feature of the protective cover, such as a toggle or other switch, a dome, map, reading or other interior light or the like.

The functional region is a part of the film layer and is formed into the film layer or provided in the film layer during manufacture of the film layer. In some embodiments, additional parts or material may be inserted into a mold of the film layer to produce the functional region. However, after the film layer is molded, any additional parts or materials necessary for the production of the functional region become part of the film layer.

Referring back to FIGS. 1A and 1B, the overhead console 100 includes a plurality of functional regions on the film layer. For example, the overhead console 100 includes a plurality of capacitive switches 128, a plurality of mechanical switches 130 and various lights 132. According to an exemplary embodiment, the mechanical switches 130 include a button or actuator that is formed by a film layer coupled to the A surface 104 of the substrate 102. Referring to FIG. 2, a slot or gap 131 extends part of the way around the periphery of button and forms an attached portion that acts as a hinge for the button. The button contacts a mechanical switch received in an opening or hole in the substrate 102. According to various embodiments, the gap around the button may be open or may be filled with a substance such as a transparent latex product.

As shown in FIGS. 1A and 1B, the overhead console 100 may also include a speaker 134 (e.g. a Bluetooth®-enabled speaker to cooperate with a mobile phone for hands-free use). According to one exemplary embodiment, the speaker 134 may be a traditional cone-diaphragm speaker and may sit behind a multitude of openings in the film layer. According to other exemplary embodiments, the speaker 134 may be a flat panel speaker and the film layer may include a multitude of printed openings to simulate the look of a traditional speaker.

Figure 3A:
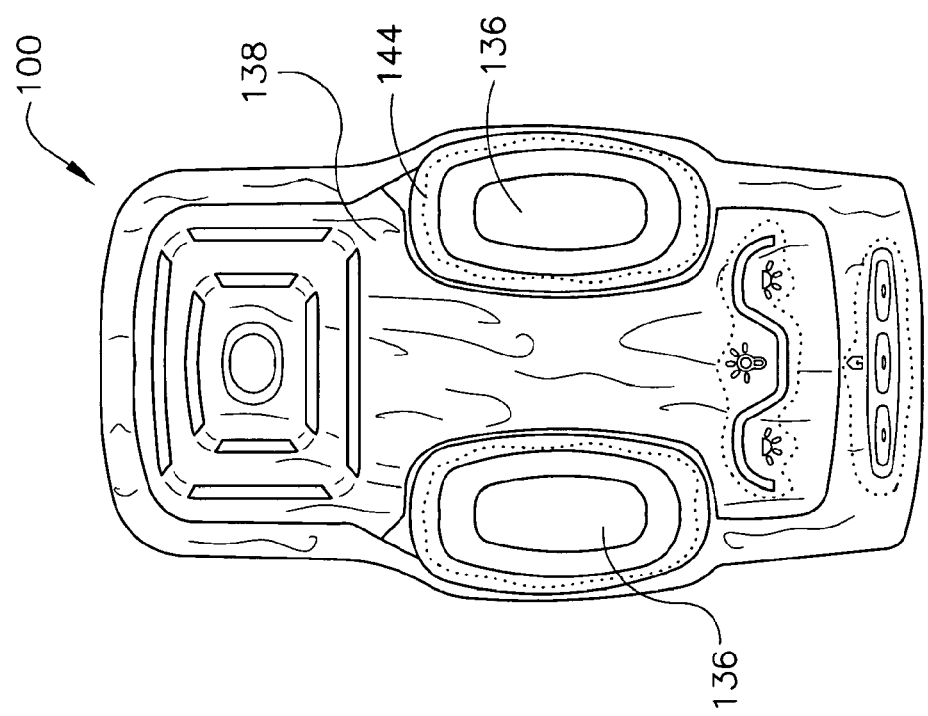
FIG. 3A is bottom view of an overhead console for a vehicle according to another exemplary embodiment shown in a lit configuration.
Figure 3B:
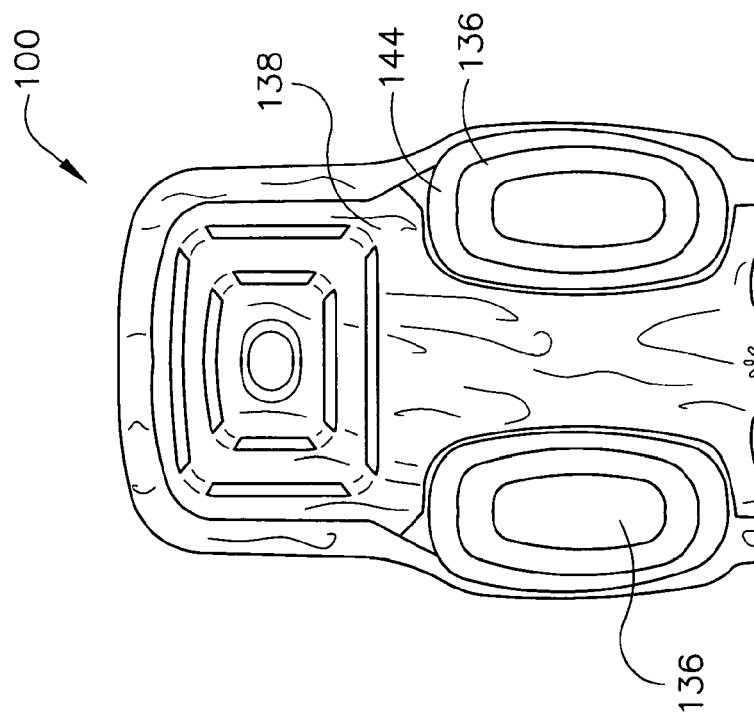
FIG. 3B is bottom view of the overhead console of FIG. 3A shown in an unlit configuration.
Figure 4:
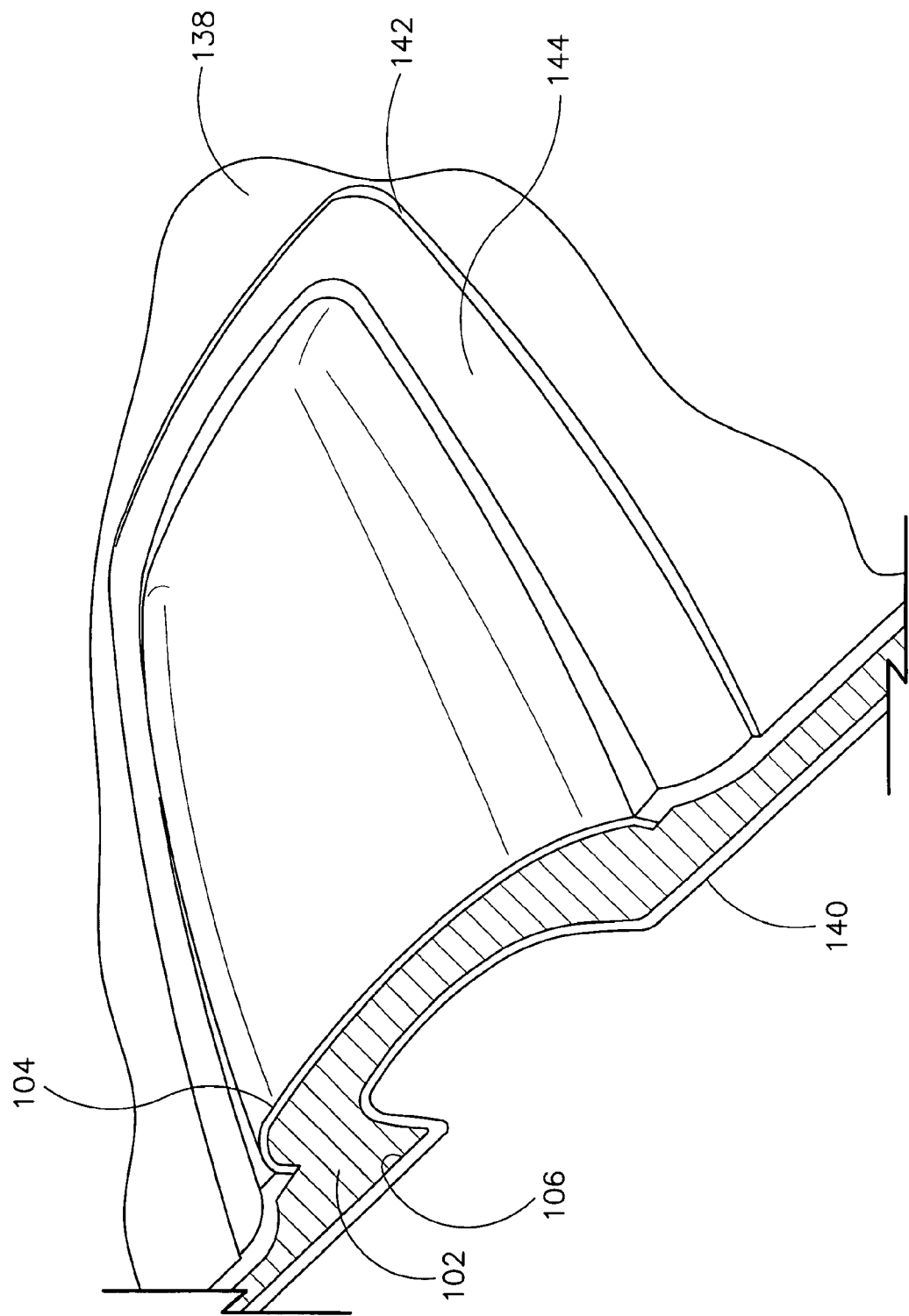
FIG. 4 is an isometric partial cross-section view of the overhead console of FIGS. 3A and 3B showing an integrally formed light according to an exemplary embodiment.

Referring now to FIGS. 3A and 3B, an overhead console 100 is shown according to another exemplary embodiment. The overhead console 100 illustrated in FIGS. 3A and 3B includes exposed extended substrate portions 136 that form integrally formed lights similar to those in FIG. 2, but include a hollow region behind the extended portions so that the thickness of the substrate 102 remains relatively constant, as shown in FIG. 4. A first film layer 138 is coupled to the A surface 104 of the substrate 102 and a second film layer 140 is coupled to the B surface 106 of the substrate 102. The first film layer 138 includes a recess 142 that defines a bezel 144 around the extended portions 136 of the substrate 102. The second film layer 140 includes a portion with a frosted or satin finish aligned with the extended portions 136 of the substrate 102. The frosted or satin finish is provided to diffuse light emanating from a light source (not shown) provided behind the second film layer 140 before the light exits the extended portion 136 of the substrate 102 at its A surface 104. The A surface 104 of the extended portion 136 of the substrate 102 is generally smooth and cooperates with the second film layer 140 to create the illusion of a frosted light source surrounded by a clear "jeweled" lens.

Referring now to FIG. 5, an overhead console 100 is shown according to another exemplary embodiment. The overhead console 100 illustrated in FIG. 5 includes a light, shown as an LED lamp 146, that is coupled to the substrate 102. As shown best in FIG. 6, the LED lamp 146 is received by the substrate 102 in a bowl or depression. The LED lamp 146 is coupled to a generally clear lens or housing that extends outward into the depression formed by the substrate 102. A film layer 148 coupled to the B surface 106 of the substrate 102 includes a frosted portion proximate to the depression. The frosted portion allows light transmitted through the substrate 102 to create a soft halo surrounding the LED lamp 146. As shown in FIG. 5, the film layer 148 may further include a reflective layer and a colored layer as described above to create a colored halo. According to various exemplary embodiments, the LED lamp 146 may be controlled by a separate switch such as those described above or may be moveable and coupled directly to a switch such that a user pushes on the lens to activate the lamp.

Referring now to FIGS. 7A and 7B, an overhead console 100 is shown according to another exemplary embodiment. The overhead console 100 illustrated in FIGS. 7A and 7B includes one or more task lights that are provided behind portions of a film layer provided on the A surface 104 of the substrate 102. The film layer is at least partially transparent to allow light to pass through, but provides a substantially opaque look or appearance when the light is turned off For example, the film layer provides a generally uniform or continuous brushed metal look or appearance when the light is turned off. In this way the task lights are hidden behind a seemingly metallic panel. According to the embodiment illustrated, the same film layer forms an interface, shown as a relatively large button 150, that actuates a switch (e.g., a mechanical switch, etc.) controlling the power for the light. The button 150 is formed the same way as described above with reference to FIG. 2.

Figure 8:
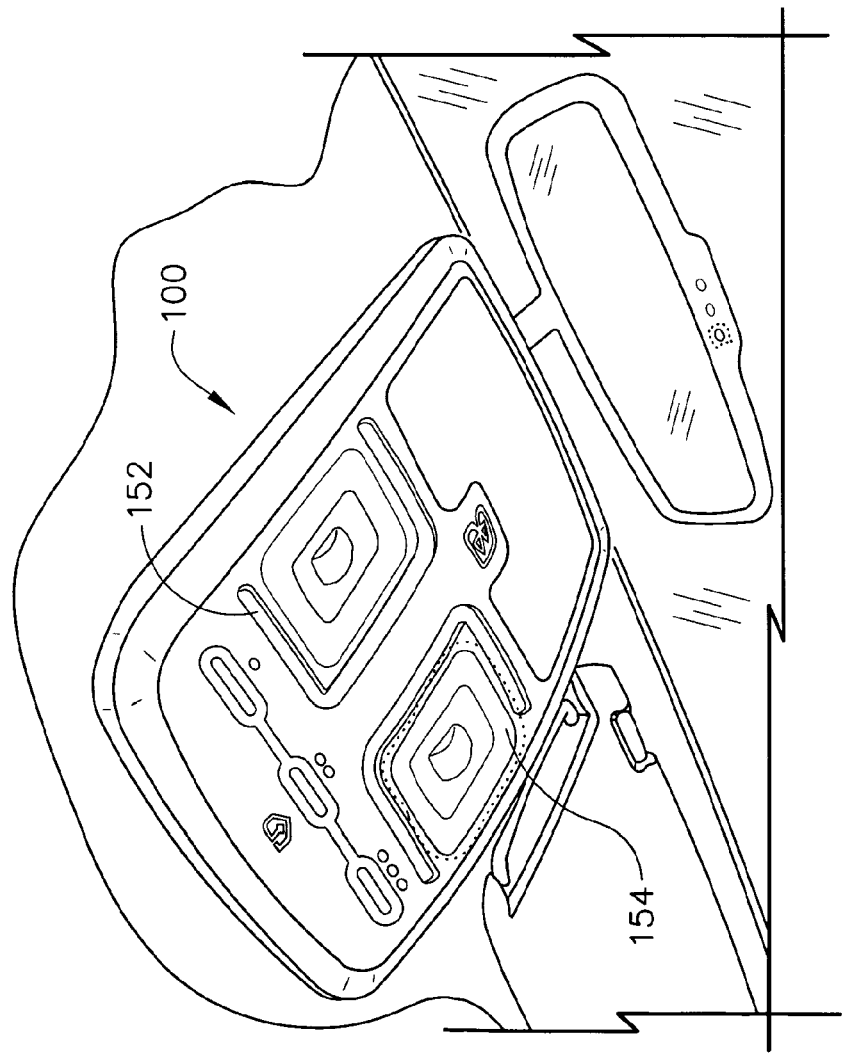
FIG. 8 is bottom view of an overhead console for a vehicle according to another exemplary embodiment.

Referring now to FIG. 8, an overhead console 100 is shown according to another embodiment. The overhead console 100 illustrated in FIG. 8 includes a first accent portion 152, that is lit by a first light source, and a second accent portion 154, that is lit by a second light source. According to an exemplary embodiment, the second accent portion 154 is lit by the task light and is formed by a generally clear portion of a film layer coupled to the A surface 104 of the substrate 102. A film layer coupled to the B surface 106 of the substrate 102 includes a reflective portion and a colored portion as described above with reference to FIG. 6.

Figure 9:
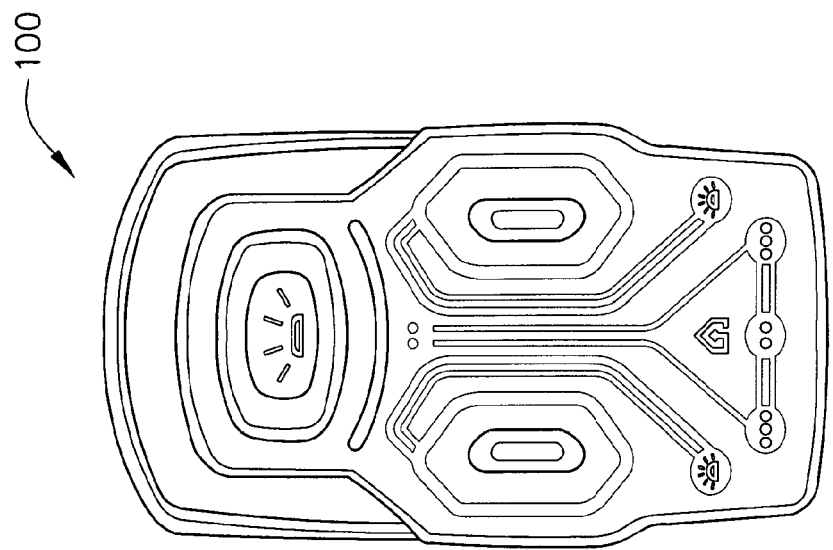
FIG. 9 is bottom view of an overhead console for a vehicle according to another exemplary embodiment.

Referring now to FIG. 9, an overhead console 100 is shown according to another exemplary embodiment. The overhead console 100 illustrated in FIG. 9 includes a substantially transparent or translucent film layer coupled to the A surface 104 of the substrate 102 so that a substantial portion of the console can function as an overhead light. Further, the conductors extending between one or more of the functional regions (e.g., switches, lights, etc.) are visible from the A surface 104 to create a decorative pattern in the overhead console 100.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The construction and arrangement of the elements of the overhead consoles as shown in the illustrated and other exemplary embodiments is illustrative only. Although only a few embodiments of the overhead console have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the overhead console may be constructed from any of a wide variety of materials that provide sufficient strength or durability, including any of a wide variety of materials (such as thin film plastic) in any of a wide variety of colors, combinations and suitable materials. Other substitutions, modifications, changes and omissions may be made in the design, operating conditions and arrangement of the preferred and other exemplary embodiments.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments.

What is claimed is:

1. An overhead console for a vehicle comprising:
   a substrate formed of a substantially clear material configured to provide a conduit for light, the substrate having a first surface and an opposite second surface;
   a first film layer coupled to the first surface of the substrate, the first film layer having a first portion simulating a first component of the overhead console and a second portion simulating a second component of the overhead console; and
   a second film layer coupled to the second surface of the substrate, the second film layer being configured to cooperate with the first film layer to affect the appearance of at least one of the first component and the second component.

2. The overhead console of claim 1 wherein the second film layer is provided behind both the first portion of the first film layer and the second portion of the first film layer.

3. The overhead console of claim 1 wherein the first portion simulates the first component having a first finish and the second portion simulates the second component having a second finish that is different than the first finish.

4. The overhead console of claim 1 wherein the first surface is an A surface that is configured to face an occupant compartment of the vehicle and the second surface is a B surface that is configured to face away from the occupant compartment of the vehicle.

5. The overhead console of claim 1 wherein the first film layer includes at least one functional region formed therein.

6. The overhead console of claim 5 wherein the functional region is at least one of a mechanical switch, a capacitive switch, a lens, a speaker and a bezel.

7. The overhead console of claim 5 wherein the functional region is configured to be substantially exposed when light passes through the substrate and substantially concealed when substantially no light is passing through the substrate.

8. The overhead console of claim 1 wherein the first film layer is at least one of partially transparent or partially translucent so that light passing through the substrate is capable of passing through the first film material.

9. The overhead console of claim 8 wherein the first film is configured to appear substantially opaque when no light is passing through the substrate.

10. An overhead console for a vehicle comprising:
    a substrate formed of a substantially clear material configured to provide a conduit for light, the substrate having a first surface and an opposite second surface; and
    a first film layer coupled to the first surface of the substrate, the first film layer defining an opening through which a portion of the substrate extends, the portion of the substrate extending through the first film and providing a lens for a lamp.

11. The overhead console of claim 10 further comprising a second film layer coupled to the second surface of the substrate and substantially aligned with the opening defined by the first film layer.

12. The overhead console of claim 11 wherein the second film layer includes a reflective portion.

13. The overhead console of claim 10 wherein a recess visually separates the portion of the substrate extending through the first film layer from the first film layer.

14. The overhead console of claim 10 wherein the substrate is a substantially transparent material.

15. The overhead console of claim 10 further comprising a functional region formed in the first film layer.

16. The overhead console of claim 15 further comprising a second opening in the first film material, the second opening provided at the functional region and configured to identify the functional region for an occupant of the vehicle.

17. A method of making an overhead console for a vehicle comprising:
    forming a substrate of a substantially clear material configured to provide a conduit for light, the substrate having a first surface and an opposite second surface;
    providing a first film layer on the first surface of the substrate, the first film layer having a first portion simulating a first component of the overhead console and a second portion simulating a second component of the overhead console; and
    providing a second film layer on the second surface of the substrate, the second film layer being configured to cooperate with the first film layer to affect the appearance of at least one of the first component and the second component.

18. The method of claim 17 further comprising providing a first opening in the first film layer and allowing a portion of the substrate to extend therethrough.

19. The method of claim 17 further comprising forming a functional region within the first film material.

20. The method of claim 19 further comprising providing a second opening in the first film layer at the functional region.

* * * * *